United States Patent
Magee et al.

(10) Patent No.: US 7,644,039 B1
(45) Date of Patent: Jan. 5, 2010

(54) AUTOMATED FINANCIAL TRANSACTION APPARATUS WITH INTERFACE THAT ADJUSTS TO THE USER

(75) Inventors: Paul Magee, North Canton, OH (US); Gary A. Ganger, Uniontown, OH (US); Paul H. Stephan, Wadsworth, OH (US); Richard F. Schlegelmilch, Bellevue, WA (US); David A. Barker, North Canton, OH (US); Daniel J. Delaney, Canton, OH (US); Alex Therrien, Akron, OH (US)

(73) Assignee: Diebold, Incorporated, North Canton, OH (US)

( * ) Notice: Subject to any disclaimer, the term of this patent is extended or adjusted under 35 U.S.C. 154(b) by 1953 days.

(21) Appl. No.: 09/778,604

(22) Filed: Feb. 7, 2001

Related U.S. Application Data

(60) Provisional application No. 60/181,655, filed on Feb. 10, 2000.

(51) Int. Cl.
  *G06Q 40/00* (2006.01)
  *G06F 17/00* (2006.01)
  *G06K 5/00* (2006.01)
  *G06K 7/01* (2006.01)
  *G07F 11/00* (2006.01)

(52) U.S. Cl. .................. 705/43; 235/375; 235/379; 235/380; 235/382; 221/9

(58) Field of Classification Search .......... 235/379, 235/375, 380, 382; 186/36, 136; 705/14, 705/43, 44, 40; 345/173, 156, 170, 788, 345/967; 348/14.09, 14.11
  See application file for complete search history.

(56) References Cited

U.S. PATENT DOCUMENTS

| | | | | |
|---|---|---|---|---|
| 5,491,495 A | * | 2/1996 | Ward et al. | 345/173 |
| 5,589,855 A | * | 12/1996 | Blumstein et al. | 345/173 |
| 5,668,573 A | * | 9/1997 | Favot et al. | 345/156 |
| 5,724,106 A | * | 3/1998 | Autry et al. | 348/734 |
| 5,765,910 A | * | 6/1998 | Larkin et al. | 297/172 |
| 5,992,570 A | * | 11/1999 | Walter | 186/36 |

(Continued)

FOREIGN PATENT DOCUMENTS

| CA | 2311005 | * | 6/2000 |
|---|---|---|---|

(Continued)

*Primary Examiner*—James P Trammell
*Assistant Examiner*—Daniel L Greene, Jr.
(74) *Attorney, Agent, or Firm*—Ralph E. Jocke; Daniel D. Wasil; Walker & Jocke

(57) ABSTRACT

An automated financial transaction apparatus (10) includes a touch screen interface (14) and a plurality of transaction function devices (22, 34, 36, 42, 46, 50, 54, 58) which operate to carry out financial transactions for users. A reading device (18, 78) senses characteristic features of users who operate the machine. Data stored in at least one data store associated with at least one computer (62, 118, 120) includes data representative of the characteristic features associated with a plurality of users and for each user, at least one interface parameter. The apparatus operates so that when the characteristic feature associated with a particular user is sensed by the reading device, the display screen and other input and output devices are changed in position or operation to accommodate the stature, disabilities, desires or other special requirements of the user.

43 Claims, 5 Drawing Sheets

U.S. PATENT DOCUMENTS

| | | | |
|---|---|---|---|
| 6,092,629 A * | 7/2000 | Bohnert | 186/53 |
| 6,131,874 A * | 10/2000 | Vance et al. | 248/550 |
| 6,154,879 A * | 11/2000 | Pare | 902/3 |
| 6,330,502 B1 * | 12/2001 | Cetinkunt et al. | 701/50 |
| 6,386,323 B1 * | 5/2002 | Ramachandran | 186/36 |
| 6,484,936 B1 * | 11/2002 | Nicoll | 235/379 |
| 6,571,218 B1 * | 5/2003 | Sadler | 705/16 |

FOREIGN PATENT DOCUMENTS

| | | | |
|---|---|---|---|
| JP | 070334096 | * | 12/1995 |
| WO | WO 98/24041 | * | 6/1998 |

* cited by examiner

AUTOMATED FINANCIAL TRANSACTION APPARATUS WITH INTERFACE THAT ADJUSTS TO THE USER

CROSS REFERENCE TO RELATED APPLICATION

This application claims the benefit of U.S. Provisional Application No. 60/181,655 filed Feb. 10, 2000.

TECHNICAL FIELD

This invention relates to automated financial transaction machines, devices, and methods. Specifically this invention relates to an automated financial transaction machine such as an ATM, payment terminal, ticket terminal, or other device which includes a user interface that adjusts to facilitate use by the particular user operating the machine.

BACKGROUND ART

Automated financial transaction machines are known in the prior art. Such automated financial transaction machines are used to carry out transactions involving transfers of value. A common type of automated financial transaction machine is an Automated Teller Machine ("ATM"). ATMs enable customers to carry out banking transactions such as receiving cash, making deposits, transferring funds, paying bills, and making account balance inquiries. The type of banking transactions the customer may carry out are determined by the capabilities of the particular ATM and the programming thereof by the institution or other entity responsible for operating the ATM. Other common types of automated financial transaction machines include payment terminals at which users may pay utility bills or other obligations. Other types of automated financial transaction machines may be used to cash checks. Other types of automated financial transaction machines include machines that dispense or accept cash, tickets, scrip, vouchers, gaming materials, or other items or things of value.

Automated transaction machines generally include a user interface through which a user is enabled to selectively operate the machine. Such user interfaces commonly include display screens, buttons, touch screen sensor devices, function keys; and other input and output devices through which a user may communicate with the machine. Designers of financial transaction machines generally strive to make the user interfaces readily used by the vast majority of people. Manufacturers of financial transaction machines, particularly ATMs, have achieved success in gaining wide customer acceptance of their machines as a result of the user friendly designs of the interfaces used.

Despite the efforts made to develop suitable user interfaces for automated financial transaction machines, certain individuals may still encounter difficulty in using such machines. Such difficulties may sometimes be encountered by persons who are significantly taller or shorter than a person of average height for whom the machines were designed. Such persons may have difficulty reading or operating the input and output devices included in the user interface.

Persons with disabilities also sometimes encounter problems in operating some types of financial transaction machines. For example, a person in a wheelchair may have difficulty seeing or providing inputs to the user interface of an automated transaction machine that is also made for use by a standing non-disabled person. Persons with impaired vision or who are blind may encounter difficulties operating financial transaction machines that are made for sighted persons. While provisions have often been made in transaction machines to accommodate disabilities or to provide special machines for use by persons with disabilities, the available solutions have not always been totally satisfactory.

Another circumstance in which automated transaction machines sometimes do not have a user interface that can readily be operated by all persons is in a drive-through environment. For example in a drive-through ATM application, the input and output devices of the user interface are generally positioned to be accessible to persons driving a standard automobile. However, persons driving higher or lower vehicles may often find it difficult to operate all the components of the user interface. It is not uncommon for example, for persons operating sport utility vehicles to have to open their doors or step outside the vehicle to operate the drive-through ATM. This lessens convenience for such persons.

An increasing number of older persons make up the population. While advances in medicine have enabled many older persons to enjoy relatively good health, there is a significant number of persons who experience problems with aging. Such problems may include impairment of vision or hearing. Persons may also have decreased manual dexterity and slower motor skills. For such persons, operating a user interface of an automated financial transaction apparatus made for use by the general public may prove difficult. This is particularly problematic as in many transaction situations, there is no other alternative to operating an automated transaction machine to carry out a desired transaction.

Increasing numbers of persons utilize portable devices with communications capabilities such as cell phones and PDAs. Such persons may prefer to conduct transactions using such portable devices rather than using the display screen and certain input and output devices located on the automated financial transaction apparatus.

Thus there exists a need for an automated financial transaction apparatus with an interface that adjusts to the particular user and that is more readily operated by such user.

DISCLOSURE OF INVENTION

It is an object of an exemplary embodiment of the present invention to provide an automated financial transaction apparatus.

It is a further object of an exemplary embodiment of the present invention to provide an automated financial transaction apparatus with an improved user interface.

It is a further object of an exemplary embodiment of the present invention to provide an automated financial transaction apparatus which is capable of identifying a user and adjusting at least one component of a user interface to a particular characteristic of a user.

It is a further object of an exemplary embodiment of the present invention to provide an automated financial transaction apparatus that may perform a plurality of transaction functions.

It is a further object of an exemplary embodiment of the present invention to provide an automated financial transaction apparatus which adjusts its operation to suit persons who may have impaired vision or hearing.

It is a further object of an exemplary embodiment of the present invention to provide an automated financial transaction apparatus that is more suitable for use by persons of other than average height.

It is a further object of an exemplary embodiment of the present invention to provide an automated financial transaction apparatus that can be used in drive-through applications to adjust the height of the user interface to a particular vehicle that is driven by a user.

It is a further object of an exemplary embodiment of the present invention to provide an automated financial transaction apparatus that may be operated responsive to a portable communications device.

It is a further object of an exemplary embodiment of the present invention to provide a method for operating an automated financial transaction apparatus.

Further objects of exemplary embodiments of the present invention will be made apparent in the following Best Modes for Carrying Out Invention and the appended claims.

The foregoing objects are accomplished in exemplary embodiments of the present invention by an automated financial transaction apparatus. Such apparatus may include a terminal such as an ATM. The ATM may include transaction function devices, including input and output devices, devices for dispensing cash, receiving cash, printing items, and other appropriate devices which may be operated to carry out transactions for users.

An ATM of an exemplary embodiment includes a reading device that operates to sense at least one characteristic feature of a user. This characteristic feature may include a biometric feature such as features of a user's face and/or voice. Alternatively, the characteristic feature may be data such as an account number associated with a user's credit or debit card. The characteristic feature may be data associated with a user's portable communications device. The ATM further includes a display screen which serves as an output device. In the exemplary embodiment, the display screen includes a touch screen interface so that the display screen serves as both an input and output device.

In an exemplary embodiment, the display screen is in operative connection with a movement mechanism. The movement mechanism is selectively operative to change the vertical height and tilt angle of the display screen. The ATM of this exemplary embodiment further includes an audio output device, an audio input device, and at least one tactile input device through which users may provide inputs to and receive outputs from the machine.

In an exemplary embodiment, the machine is in operative connection with a computer. The computer includes a data store. The date store includes data corresponding to a plurality of users who may use the machine. For each of the plurality of users, there is stored in the data store an associated characteristic feature which is sensed by a reading device at the ATM for purposes of identifying the particular user or a category associated with the particular user. The data store also includes data representative of at least one interface parameter associated with each particular user or category of users. The interface parameter is usable by the computer for purposes of controlling operation of the user interface of the ATM.

In operation of an exemplary embodiment, a user at the ATM has a characteristic feature sensed by the reading device which is positioned on or adjacent to the ATM. Data corresponding to this characteristic feature is used by the computer to determine one or more interface parameters associated with the particular user at the ATM. The computer then causes the movement mechanism to adjust the position of the screen display to correspond to the physical stature or position or other characteristic of the particular user. In this way, the touch screen display of the exemplary ATM is raised to a height and tilted to an appropriate position that is convenient for operation by the particular user.

In an exemplary embodiment, for those particular users who have a vision impairment, the interface parameters may as appropriate cause an increase in the size or nature of text, graphics, or other features in the outputs presented to the user through the display screen. In situations where the user is not a speaker of the language that is common in the area of the terminal, the interface parameter may also operate to cause the computer to present the outputs in a language or language format that is better understood by the user. Forms of the invention may also cause a computer to operate responsive to interface parameters to change color schemes or contrast in displays, to make the indicia therein more readily visible to a person such as a person with a vision impairment. Different sequences of outputs through the display screen may also be provided to accommodate the need to use different textual, graphic or other materials for a particular user.

In circumstances where a particular user is blind, the computer may be operative to cause an audio output device to provide voice guidance in operation of the machine. Alternatively or in addition a tactile input device on the ATM may become operative in response to the interface parameters corresponding to the user. In an exemplary embodiment, a user is enabled to operate the tactile input device such as a keypad and function keys to carry out desired transactions. Such keypad and function keys may be encoded with Braille or other suitable tactile indicia so that they may be properly sensed and operated by a blind person. Further, the interface parameters may cause the machine to operate without having the screen display provide any of the transaction data while the machine is operated by the blind user. This avoids the risk that an unscrupulous person may attempt to learn account or other information from the blind user by observing the screen display as the user operates the machine. In embodiments of the invention the screen outputs may also be controlled to avoid presentation of certain transaction data when a user operates the machine through a portable communications device.

In exemplary embodiments, an ATM may further include audio output devices which operate in the course of performing transactions. The ATM may further include an audio input device through which a user may provide audio inputs. In response to interface parameters indicating that a particular user has a hearing impairment, the computer may cause the ATM to operate to compensate for the user's disability. Such compensation may include making a handset available to the user through which a user may receive audio outputs at an increased volume level. In embodiments of the invention masking sounds commonly referred to as "white noise" may be output to reduce the risk that audible inputs or outputs can be overheard by other than the user of the machine. Alternatively, in some embodiments, an electrical, radiation or other type connector may be provided on the machine so that a user may connect an audio output device associated with the user to the machine to receive amplified, electronic or otherwise modified forms of the audio instructions. Similarly, in the case of a person who has a speech impediment, the interface parameters for that particular person may operate to cause the ATM to operate in a manner that enables operation of the machine either through different forms of audio input than are normally accepted, or through inputs through the touch screen or tactile input device.

Various options and devices may be provided to tailor the user interface of a machine to the particular user based on the particular interface parameters associated with the user and the capabilities and requirements of the particular automated financial transaction apparatus.

BEST MODES FOR CARRYING OUT INVENTION

Figure 1:
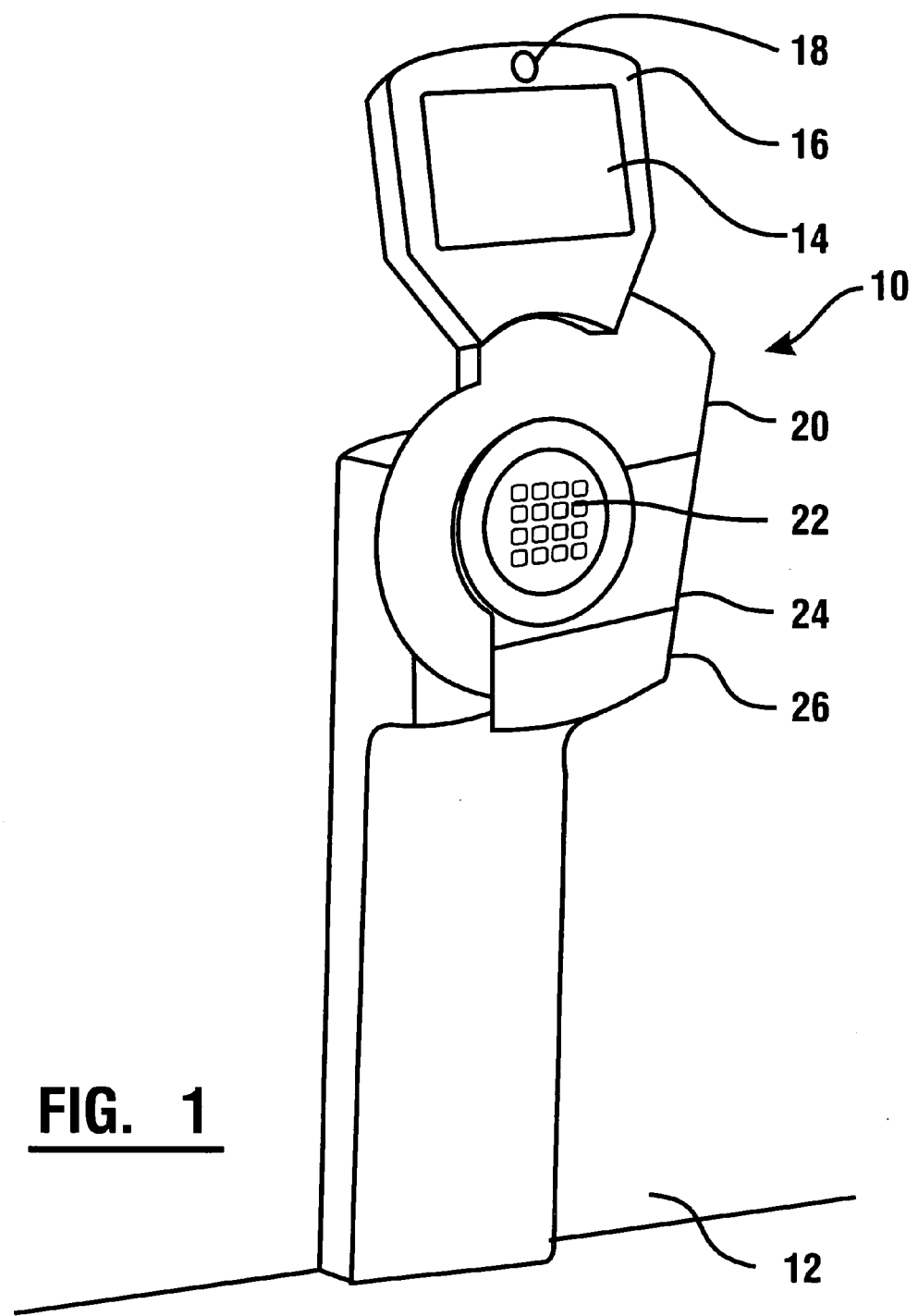
FIG. 1 is an isometric view of an automated financial transaction apparatus of an exemplary embodiment of the present invention.

Referring now to the drawings and particularly to FIG. 1 there is shown therein an exemplary ATM generally indicated 10, used in connection with an exemplary embodiment of the present invention. ATM 10 is a through-the-wall configuration in which the ATM is mounted in supporting connection with a wall 12. In the embodiment shown, ATM 10 is preferably used by persons within the interior of a building and wall 12 is an interior wall. It should be understood however, that other embodiments of the present invention may be used in a stand alone or lobby configuration in which the components of the ATM are in supporting connection with an enclosure that is not supported by a wall. Further alternative embodiments of the invention may be used in connection with an external environment such as a drive-through environment in which users access the user interface of the machine from their vehicles. As will be apparent from the following description of the exemplary embodiment, the principles of the invention may be used with a wide variety of automated financial transaction devices.

ATM 10 includes a display screen 14. Display screen 14 may be a visual display screen of an LCD, flat panel, CRT, or other type display through which outputs may be presented to a user. In the exemplary embodiment, display screen 14 is a touch screen type display. Users may provide inputs to the machine by bringing a finger or other item adjacent to the touch screen as well as receive outputs through the display screen. In the exemplary embodiment, display screen 14 is positioned in supporting connection with a housing 16. As later explained in the exemplary embodiment, housing 16 including display screen 14 are moveably mounted relative to the other components of the ATM.

Housing 16 further includes a camera 18. Camera 18 serves as a reading device which can be used for sensing appearance characteristics of users adjacent to ATM 10. It should be understood that camera 18 is but one of many different types of reading devices that may be used in connection with embodiments of the invention to identify characteristic features of a user. For example in alternative embodiments, reading devices such as magnetic stripe readers, smart card readers, contactless card readers, iris or retina scan devices, fingerprint readers, voice recognition devices, or other devices which may identify a characteristic feature that is associated with a particular user of the machine may be used.

ATM 10 further includes a body portion 20. Body portion 20 has supported thereon a keypad 22. Keypad 22 serves as a tactile input device through which a user may provide instructions or data to the machine. In the exemplary embodiment, keypad 22 preferably includes Braille or other tactile indicia on the keys which make up the keypad to facilitate use by a blind person.

Body portion 20 further includes access doors 24 and 26. The access doors are used to selectively limit access to components of transaction function devices which operate in the machine. Access doors 24 and 26 may be opened by authorized persons or, in alternative embodiments, opened automatically by actuators in the course of transactions so that a user can obtain access to particular items and devices which operate in the machine.

Figure 2:
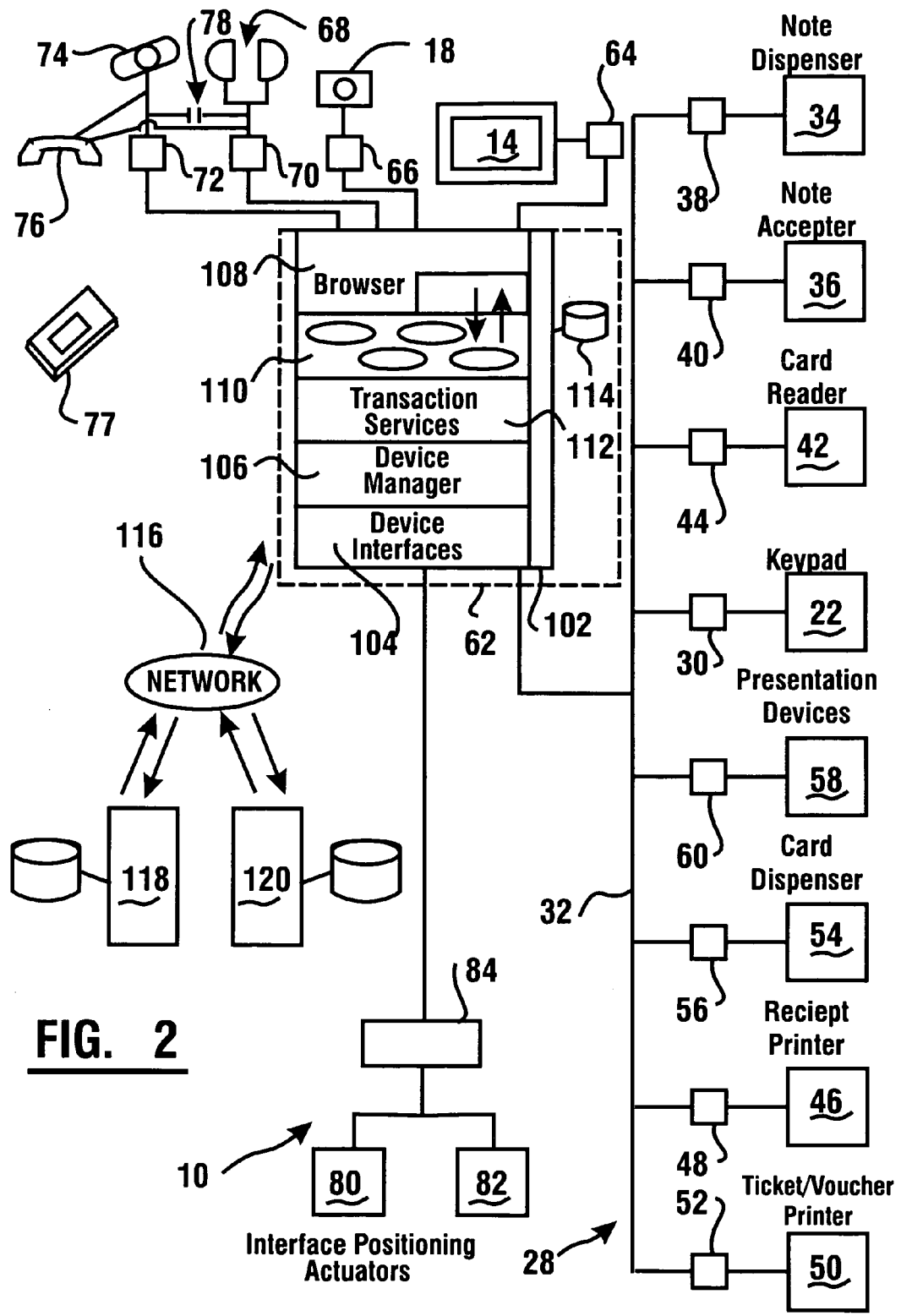
FIG. 2 is a schematic view of components associated with an exemplary automated transaction apparatus like that shown in FIG. 1.

As shown in FIG. 2, the exemplary embodiment of ATM 10 includes a plurality of transaction function devices generally indicated 28. The transaction function devices included in ATM 10 include the keypad 22 previously discussed, which in the exemplary embodiment is connected through an electronic interface 30 to a device bus 32. Other transaction function devices included in ATM 10 which are connected to the device bus include a note dispenser 34 and a note acceptor 36. The note dispenser is selectively operative to deliver cash such as currency notes to a user of the ATM as the machine operates to assess an appropriate charge to the user's account for notes dispensed. Alternatively notes may be dispensed in return for items of value such as checks, or value on a stored value card input to the machine. The note acceptor 36 is operative to receive and authenticate notes that are input to the ATM by a user. The ATM may operate to credit a user's account for notes received by the note acceptor or alternatively, a user may apply the value of input notes to the purchase of tickets, vouchers, stored value cards or other items as later explained. Note dispenser 34 and note acceptor 36 are each connected to the device bus through respective interfaces 38 and 40.

Another transaction function device included in ATM 10 is a card reader 42. Card reader 42 may in embodiments of the invention be a magnetic stripe type card reader, a smart card reader, contactless card reader, RF back scatter type card reader, or other type reader device suitable for reading data on a card or article presented by a user. Card reader 42 is connected to the device bus through a corresponding electronic interface 44. In this exemplary embodiment, card reader 42 provides a further or alternative reading device through which characteristic features associated with a user may be received by the machine.

The transaction function devices in the exemplary embodiment further include a receipt printer 46 which is connected to the device bus through an interface 48. The receipt printer is operative in ATM 10 to provide the user with printed receipts for transactions conducted at the machine. ATM 10 includes a further printer 50 which is connected to the device bus through an interface 52. Printer 50 may be used in exemplary embodiments for printing tickets, vouchers, or other items of value. These may include for example, airline tickets, theater tickets, betting slips, bank checks, money orders, personal checks, or other printed articles which have or which may be redeemed for value. Of course, embodiments of the invention may include additional or other types of printers or articles which can be provided to a user. These may include for example printers suitable for producing maps, photographs, graphs, sales receipts or other items.

The exemplary embodiment of ATM 10 further includes a card dispenser 54 which is connected to the device bus through an interface 56. In the exemplary embodiment, card dispenser 54 may be a phone card or stored value card or other card dispenser which dispenses card type articles that may be used to obtain goods or services. Such card type articles may include articles with predetermined value. Alternatively, the card articles dispensed may be loaded with data representative of value through operation of the ATM. In the case of smart cards which are reloadable, cards may be dispensed with or without value thereon from the card dispenser 54 and may thereafter be additionally loaded or reloaded through operation of the machine using card reader 42. Of course, alternative embodiments of the invention may dispense other types of articles as well.

The exemplary embodiment of the invention further includes other types of transaction function devices schematically represented as presentation devices 58. Presentation devices 58 are shown connected to the device bus through an interface 60. It should be understood that the presentation devices may include one or more types of devices which work in conjunction with other components to make available, receive from or deliver articles to a user. Presentation devices used in connection with the exemplary ATM can include devices for presenting and transporting notes to and from a user. Other presentation devices are operative to lock and unlock and/or open and close access doors 24 and 26. Of course, additional or different types of presentation devices may be used in embodiments of the invention depending on the types of transaction function devices included therein.

It should be understood that ATM 10 is but one of many types of automated financial transaction devices which may employ the principles of the present invention. The particular types of transaction function devices used in a particular transaction apparatus will depend on the types of transactions to be performed. It should be understood that the present invention encompasses automated financial transaction machines and methods which include other, different or lesser numbers of transaction function devices than those described in connection with the exemplary embodiment.

ATM 10 includes at least one computer schematically indicated 62 therein. Computer 62 is in connection with the device bus 32 previously described. The computer provides signals to and receives signals from the transaction function devices connected to the device bus. The computer 62 is also in operative connection with the display screen 14 which is connected thereto through a device interface 64. Also in operative connection with the computer 62 through an interface 66 is camera 18.

The exemplary embodiment of ATM 10 further includes at least one audio output device schematically indicated 68. In the exemplary embodiment, the audio output device 68 includes stereo speakers which are used to provide a user with audible outputs. The audio output device 68 is connected to the computer through an appropriate interface 70. Also connected to the computer 62 through an interface 72 is a microphone 74. Microphone 74 serves as an audio input device through which users may input audio information to the machine. A handset schematically indicated 76 is included in the exemplary embodiment of ATM 10. The handset 76 includes both an audio input and an audio output device for users of the machine. A connector schematically indicated 78 is also provided so that users may connect portable audio output and/or audio input devices to the machine. Connector 78 may in embodiments of the invention be an electrical connector to which a user may connect a headset to the machine. Alternatively, connector 78 may be an infrared, RF or other type of output and/or input device to which a user may couple an external portable device carried by the user to the machine. Such portable devices are schematically represented in FIG. 2 by a communications device 77. It should be understood that device 77 may include for example devices such as a handheld computer, personal digital assistant, cell phone or other device which is capable of receiving outputs and/or providing inputs to the machine. It should be understood that the devices discussed in connection with ATM 10 are exemplary and in other embodiments other types of input and output devices and/or devices for communicating with a user or apparatus carried by a user may be included.

As later discussed in detail, included in ATM 10 is a movement mechanism which is operative to selectively move display screen 14. In the exemplary embodiment, this is accomplished using interface positioning actuators 80 and 82. The positioning actuators in the exemplary embodiment include a pair of electro-pneumatic positioning devices which adjust the vertical height and angle of tilt of the display screen. It should be understood however, that in embodiments of the invention, various types of positioning actuators may be used. These may include for example, electromagnetic types of positioning devices, hydraulic devices, electronic devices, or other devices suitable for providing controlled movement. Positioning actuators 80 and 82 are operatively connected to computer 62 through one or more appropriate interfaces 84.

Figure 3:
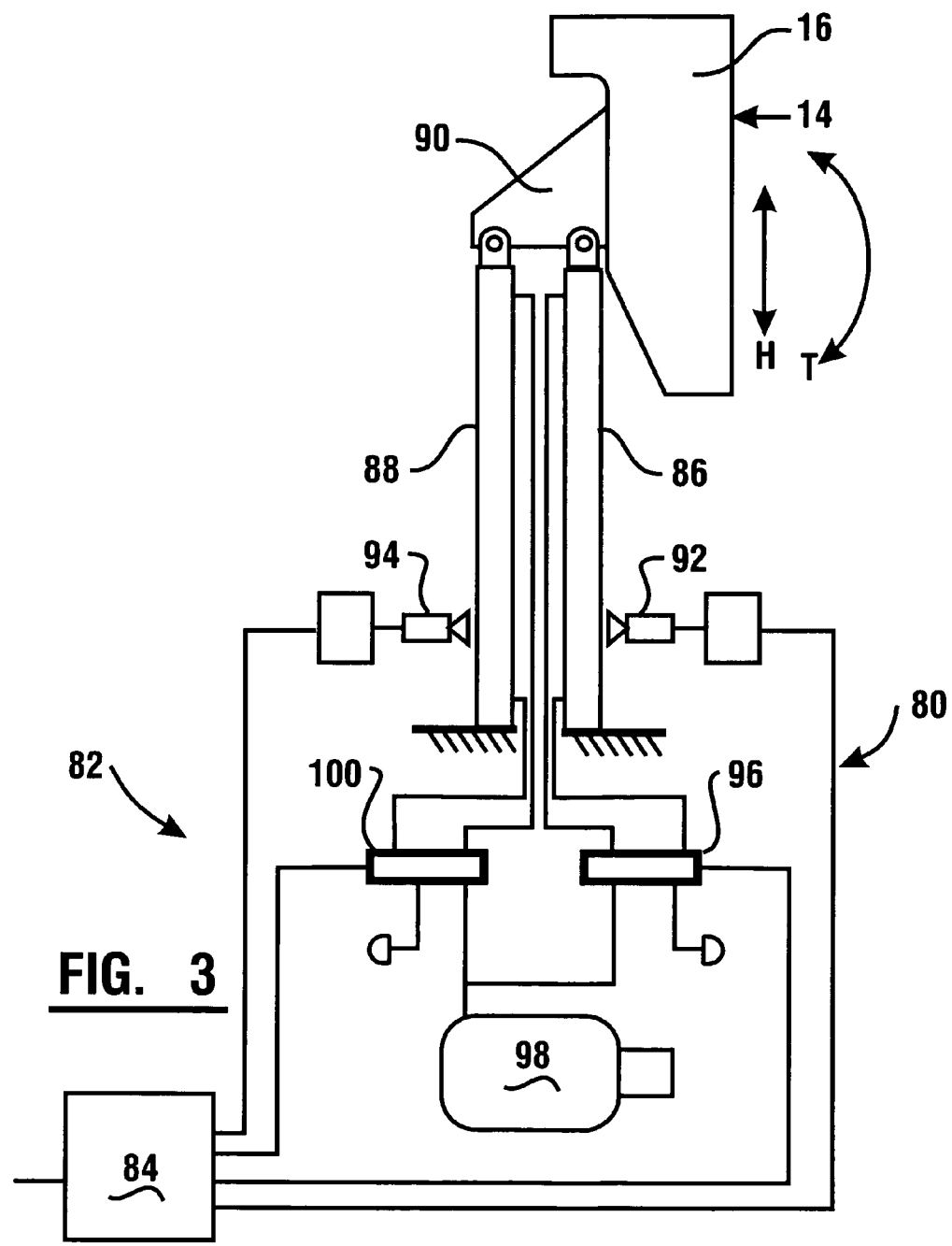
FIG. 3 is a schematic view of components used for positioning a display screen of the transaction apparatus shown in FIG. 1 in a desired position.

As shown in greater detail in FIG. 3, the positioning actuators 80 and 82 each include an associated pneumatic actuator 86, 88 respectively. A moveable rod associated with each pneumatic actuator is operatively connected through appropriate bracketry 90 to the screen housing 16 and the display screen 14 in supporting connection therewith. As can be appreciated from FIG. 3, selective movement of the cylinder rods associated with pneumatic actuators 86 and 88 are operative to adjust the vertical height of the display screen as indicated by arrow H in FIG. 3. Relative movement of the cylinder rods is operative to selectively adjust the tilt angle of the display screen as indicated by arrow T in FIG. 3.

The position of the rod member within each pneumatic actuator is sensed by at least one sensor. This is schematically represented by a sensor 92 associated with pneumatic actuator 86 and a sensor 94 associated with pneumatic actuator 88. Sensors 92 and 94 may be of the optical type, magnetic type, or other type sensor which is operative to sense the position or movement of the rod member in the actuator. Sensors 92 and 94 are operatively connected to the interface 84 which is operatively connected to computer 62. It should be understood that the sensing approach shown is exemplary and in other embodiments other sensing approaches may be used.

In this exemplary embodiment, an electro-pneumatic control valve 96 is operative to selectively direct pressurized air from a pneumatic pressure source, schematically indicated 98, to the respective ends of the pneumatic actuator 86. Through signals to valve 96 fluid pressure is selectively directed to and from the ends of pneumatic actuator 86 so as to move and position the rod member therein. Control valve 96 is operative to also enable air that needs to be exhausted from the actuator to accomplish movement, to escape to atmosphere through the valve. The control valve 96 is also operative to maintain pneumatic pressure in the pneumatic actuator 86 so as to maintain its current position when desired. A control valve 100 similar to control valve 96, is in fluid connection with the pressure source and the pneumatic actuator 88. Electrical signals to control valve 100 are operative to selectively move the rod member in pneumatic actuator 88.

As can be appreciated from FIG. 3, the exemplary form of the present invention enables selectively moving the rod members associated with actuators 86 and 88 and controlling the positions thereof responsive to sensors 92 and 94. Control valves 96 and 100 may be selectively operated to deliver fluid pressure to and to exhaust fluid from the pneumatic actuators so as to position the display screen in a desired vertical position and with a desired tilt angle. This enables positioning the display screen in a position as desired to suit the physical characteristics of a particular user operating the machine. As can be appreciated by those skilled in the art however, in other embodiments of the invention other types of movement mechanisms may be substituted for the electro-pneumatic control system shown in FIG. 3. Many other types of movement mechanisms which are suitable to adjust the position of the display screen or other components relative to a user may be used in alternative embodiments of the invention. Alternative forms of the invention may operate to vertically, horizontally, rotationally or angularly adjust the position(s) of one or more components of the machine so as to facilitate or prevent the use thereof by a user.

Referring again to FIG. 2, the computer 62 in ATM 10 has various software components operating therein. The software components used in the exemplary embodiment include OPTinet® software which is commercially available from Diebold, Incorporated, the assignee of the present invention. The software may be configured and operated in a manner similar to that described in U.S. patent application Ser. No. 09/193,787 filed Nov. 17, 1998 and International Publication No. WO98/24041 published 4 Jun. 1998, the disclosures of which are incorporated herein by reference. Of course, it should be understood that this software configuration is exemplary and in other embodiments other software configurations may be used.

In the exemplary embodiment of the invention, software architecture includes an operating system layer 102. The operating system layer may be one of several types, such as Windows® NT or Windows® 2000 available from Microsoft, OS/2 Warp 4 available from IBM or Linux. In the exemplary embodiment, the software includes one or more device interface layers which are operative to provide software interfaces with transaction function devices as well as other devices that are operatively connected to computer 62. In the schematic representation shown, a device interface layer 104 is operative to provide software interfaces with the transaction function devices and the interface positioning actuators. It should be understood that other devices also include software interfaces. However, these interfaces have not been represented in FIG. 2 to simplify the schematic diagram.

The exemplary software architecture operating in the computer 62 also includes a device manager layer 106. The device manager layer in the exemplary embodiment is operative to coordinate the interaction of the devices for purposes of carrying out transactions with ATM 10. In the exemplary embodiment, the device manager layer may also be operative to provide status messages and diagnostic information concerning devices to other software components as well as to other systems and devices with monitor operation of the ATM.

The software architecture in the exemplary embodiment also includes a browser component 108. Browser 108 may include, for example, a Netscape Navigator™ browser available from Netscape or an Internet Explorer™ browser available from Microsoft. The browser is operative to process instructions included in documents such as HTML, XML, and other documents which produce visual and other forms of outputs. In the exemplary embodiment, documents processed by the browser also include embedded instructions which are operative to control transaction function devices.

In the exemplary embodiment, documents processed in the browser are operative to produce visual outputs through the display screen 14. Embedded instructions in documents are further operative to interface with programs in a director manager layer 110. In the exemplary embodiment, the director manager layer includes a plurality of applets, each applet being associated generally with one particular type of transaction that is carried out by the ATM.

The transaction services software layer 112 in the exemplary embodiment is operative to coordinate and control communications and activities between the other software components, as well as other frameworks and plug-ins that may be used in connection with the computer. For example in the exemplary ATM, the transaction services layer works in conjunction with other programs to assure that only documents and messages received from authorized systems are enabled to operate the ATM. This is done using various approaches such as the use of encryption programs, digital signatures, or other techniques suitable to ensure that only appropriate systems interact with the ATM. In embodiments where the system communicates with wireless portable communication devices, security approaches such as SWAT provided by Capslock, Inc. or authentication and encryption services software available from VeriSign or other approaches may be used. As schematically indicated in FIG. 2, computer 62 includes a data store 114 in operative connection therewith. The data store is operative to hold program instructions and other data to enable operation of the computer to carry out transaction functions and to maintain records of those transactions that have been carried out.

As schematically represented in FIG. 2, computer 62 of the exemplary embodiment communicates through a network 116 with one or more remote computers. These remote computers represented schematically, include computers 118 and 120 which may be associated with banking institutions or other entities which authorize the conduct of transactions at ATM 10. Alternatively or in addition, the remote computers may be associated with service provider stations from which service providers may communicate with users at the terminal. In the exemplary embodiment, network 116 may include one or more networks. These networks may include a Local Area Network to which access is restricted. Alternatively, network 116 may include a Wide Area Network including the Internet. In such circumstances, additional computers which operate as firewalls or proxy servers may be included in the system to reduce the risk of unauthorized access or operation of ATM 10. Of course, the particular configuration used will vary with embodiments of the invention, including the particular type of automated financial transaction device being operated and the nature of the transactions being conducted.

In an exemplary embodiment of the invention, one or more of the computers in the system include data in their associated data store which corresponds to a plurality of authorized users of the system. This data may be stored for example, in the data store associated with one or several of computers 118, 120, and 62 shown in FIG. 2. Alternatively, portions of the user data may be stored in each of the data stores. The user data concerning authorized users may include data required by the system to carry out transactions. This may include for example, information concerning user account numbers, user account balances, restrictions, limits, or other information that is useful in identifying a user and/or processing transactions for a user.

In the exemplary embodiment of the invention, the data associated with the user includes data representative of at least one characteristic feature. This at least one characteristic feature may be a feature which is uniquely associated with the particular user or may correspond to a subject or group of users. In exemplary embodiments of the invention, the characteristic feature may include the user's name, account number or digital signature which may be associated with a card, a portable device or other article carried by the user. In an exemplary form of the invention, at least one characteristic feature includes an appearance feature of the user. This may include the appearance of the user's face which can be used for distinguishing each of the plurality of the users from other users. Commercially available software such as Miros™ software produced by Sun Microsystems or Face-It™ software produced by Lernout & Hauspie are of the types that may be used for identifying the user through the appearance of their facial features.

Alternatively, a user may be identified through appearance features such as an iris scan or a retina scan, both of which identify users through appearance features associated with the user's eye or eyes. Alternative appearance features which may be used to identify a user include one or more fingerprints or portions thereof which can be read by transaction function devices such as a fingerprint or thumbprint reader and which data can be used to identify a particular user.

Alternative characteristic features may include voice features associated with the user. Features of the user's voice may be used to identify each particular user and distinguish them from other users. In addition, combinations of features may also be used to identify a particular user. For example, the system described in U.S. Pat. No. 6,023,688, identifies an authorized user through both appearance and voice features. This patent disclosure is incorporated by reference as if fully rewritten herein. Of course, in other embodiments of the invention, other types of characteristic features which can be sensed by a reading device and associated with and used to identify and/or distinguish a user as being a part of a group of users, or a particular user from among a plurality of users for which characteristic feature data is stored, may be used.

Also stored in one or more of the data stores in operative connection with computers in connection with the exemplary system, is one or more interface parameters. The interface parameters in the exemplary embodiment correspond to particular properties or attributes of the input and/or output devices at the ATM that will facilitate the user's ability to conduct a transaction. In an exemplary embodiment, at least one of the interface parameters is operative to move the display screen so as to facilitate viewing thereof and providing inputs thereto by the particular user. In this exemplary form of the invention, these interface parameters are operative to control both the vertical height and the angle of tilt of the display screen so as to position the screen in a suitable location for the particular user. As a result, the interface parameters which are operative to cause the computer to position the display screen may be based on the user's height for those users who conduct transactions through the display screen.

In an exemplary embodiment of the invention, the interface parameters may also be operative to determine or control outputs from the display screen. In the conduct of transactions, outputs from the display screen may include one or more sequences of outputs in which text, icons, or numerals are included. The interface parameters associated with each user may cause the computer to operate to control aspects such as the size of text, icons, or numerals presented. One or more of the interface parameters may also be operative to control one or more of two or more colors which are included in graphical or other displays. For example, the interface parameters associated with a user who is not blind but who has a vision impairment, may cause the presentation of one screen or sequence of screens which have larger or different colored text, icons, and/or numerals than those contained in outputs or sequences which may be presented to persons who do not have impaired vision. Interface parameters may also cause the terminal to output screens in language that is different from the language normally presented to users of the terminal. The interface parameters associated with a particular user may be indicative that the user is a speaker of a language such as a particular national language or is a user of particular terms, expressions or terminology. The computer is operative responsive to the stored interface parameters associated with the user to cause outputs or a sequence of outputs through the display screen in the language of the user. This may enable the user to more readily operate the ATM.

It should be understood that in embodiments of the invention, outputs may be generated responsive to data corresponding to web pages or other documents which are stored in data store 114, in the terminal or which are accessed from computers connected to network 116. Alternatively or in addition, outputs may be generated by one or more computers dynamically to fit the requirements indicated by the interface parameters associated with the user.

The exemplary form of the present invention has been described with regard to a particular arrangement of computers. However it should be understood that for purposes hereof a reference to a computer shall also encompass a plurality of computers or processors which are in operative connection. Likewise a reference to a data store shall encompass one or more data stores.

An exemplary embodiment of ATM 10 includes audio output and input devices. These devices may be used as a supplement to or as a substitute for, the display screen in the conduct of transactions. For example, the user who cannot actuate the touch screen may provide inputs to the system through the audio input device 74 or through audio instructions through the handset 76. Alternatively or in addition, a visually impaired person may receive instructions through the audio output device 68 or through the handset 76. One or more of the interface parameters stored in a data store in associated relation with the data concerning a particular user may cause the computer to operate these devices in a manner which enables the user to carry out transactions. Alternatively or in addition, the interface parameters may also cause the display screen to be blank and/or positioned so as to not be readily visible to others when the transaction is being carried out through another device.

In addition to controlling the operation of audio output and/or input devices to be used to communicate with a user based on the interface parameters, the interface parameters may also be operative to cause the computer to control features of the output audio information as well as change the nature of the audio inputs. For example, a person who is hearing impaired may have associated interface parameters which cause all or selected portions of the audio spectrum to be amplified through the audio output device 68 or through the handset 76. Alternatively, interface parameters associated with the user may change the language or other characteristics of the audio outputs. The language or character of audio input information received through the audio input device 74 or through the handset 76 to provide inputs which affect operation of the machine may also be modified responsive to the interface parameters associated with a particular user. This may enable a particular user to provide audio inputs in different language than is otherwise used by persons operating the terminal in the locale where the terminal is located. Alternatively, a user who is only capable of making certain sounds which may not normally be recognized as speech are nonetheless able to be received and analyzed as responsive to outputs presented by the machine. For example, in some embodiments where the user communicates in an audible manner, the computer may operate so as to generate masking sounds through the audio output device. This may be done so as to reduce the risk of interception of communications. Such audio masking sounds or "white noise" may be produced by the machine or by other connected systems operating responsive to the machine to achieve this purpose. Various other aspects and capabilities can be achieved in embodiments of the invention for facilitating or protecting communication with the user.

Alternatively, in some embodiments users may wish to use input and/or output devices which are portable and which are brought by a user to the machine. For example the user may receive audio outputs through their portable device by operative connection to an appropriate connector 78. As previously discussed, the connector may include a physical electrical connection to which a user may connect an audio output and/or input device. Alternatively, the connector may be an IR or RF connection, for example, and in such cases a user may employ a device or appliance which enables the user to communicate the same or an equivalent of an audio input and to receive the same or an equivalent of an audio output through the device or appliance which the user can operate. Other devices may provide the equivalent of visual or tactile inputs and outputs. Such an appliance may include a hand-held computer; personal digital assistant; cell phone or other device through which a user can communicate messages through the connector as later discussed. The particular manner of communication and the format of the messages may be tailored to the particular user or user device responsive to the one or more interface parameters associated with the user.

In an exemplary embodiment, interface parameters may also be operative to identify a particular user as being blind. In such circumstances, the interface parameters are operative to cause the computer to enable operation of the keypad 22. The keypad serves as a tactical input device through which the user is enabled to provide inputs which control the operation of transaction function devices such as the note dispenser or note acceptor. In the exemplary form of the invention, the interface parameters which indicate that the user is blind are further operative to cause the computer to render the display screen inoperative or at least not in a mode where transaction-related data is displayed or is readily viewable. This prevents an unscrupulous person from observing the conduct of the transaction and stealing private information of the user. Further, as can be appreciated, the interface parameters associated with particular blind individuals may provide for inputs and outputs through the audio input and output devices or the handset, and for controlling operation of the transaction function devices and/or white noise generating devices in response thereto. The interface parameters may provide for different ways of communicating with the machine based on individual preferences and a particular individual's capabilities.

An exemplary form of the invention may also enable a user at the terminal to communicate with a remote service provider. Such communication may include one or two way audio and/or video. Interface parameter data may be used to automatically connect the terminal with an appropriate service provider. Alternatively, service provider communications may be modified to suit the user responsive to the interface parameters.

Figure 5:
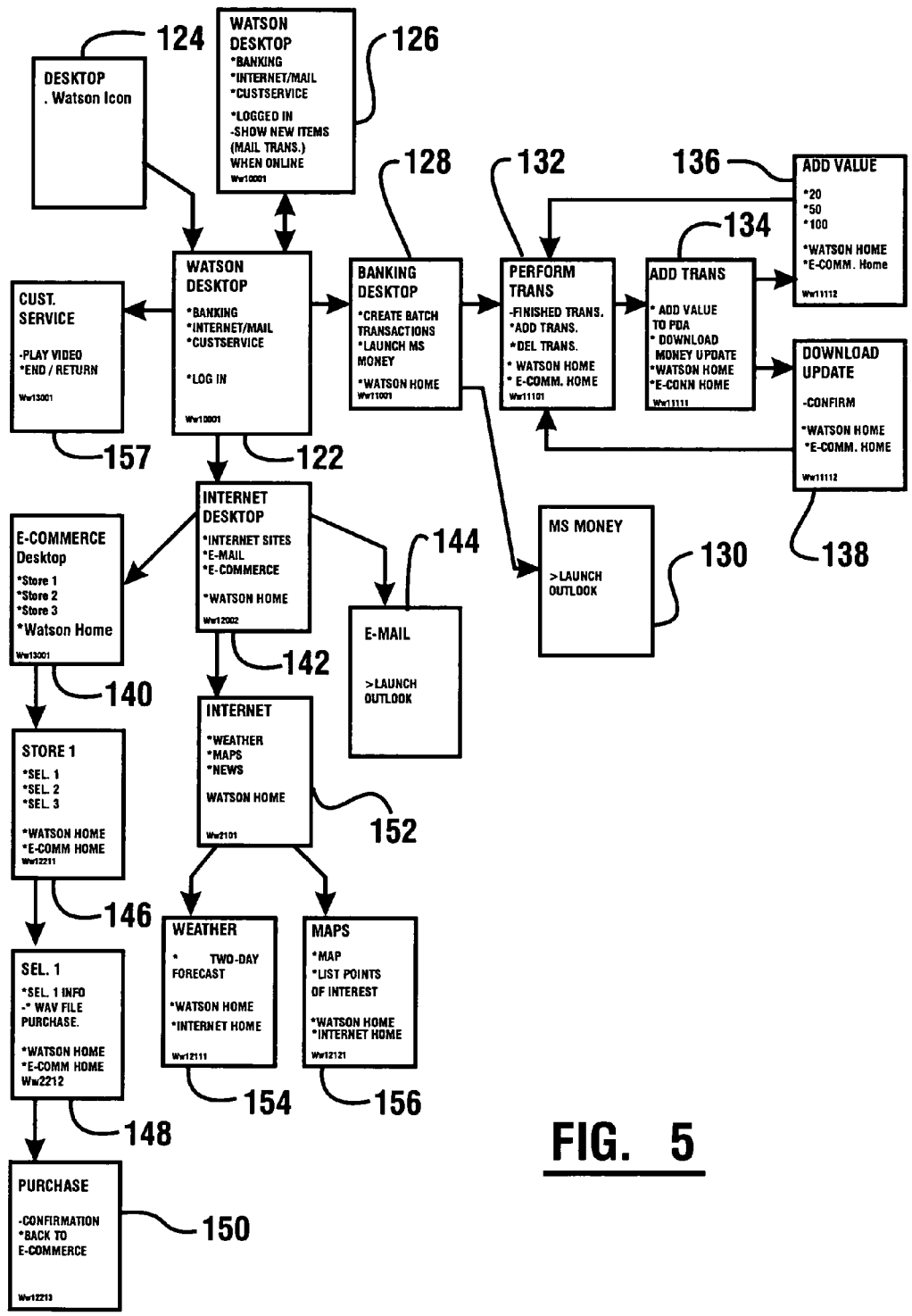
FIG. 5 is a schematic view of an exemplary user interface for a handheld communication device used in connection with an alternative exemplary embodiment of the present invention.

FIG. 5 schematically represents the use of an exemplary form of ATM 10 in connection with a portable device carried by a user. Such a portable device may include for example a personal digital assistant, cell phone, portable computer or other device which may communicate with the ATM through an appropriate type of connector 78. FIG. 5 indicates schematically an exemplary logic flow developed by the assignee of the present invention which is referred to as the Watson™ application. This software application operates on a PDA such as a Compaq® Ipaq™. Of course it should be understood that in other embodiments other types of portable devices and applications may be used. The principles shown and described in U.S. patent application Ser. No. 09/505,594 filed Feb. 16, 2000, and corresponding International Publication WO 00/49547 dated Aug. 24, 2000, may be used in embodiments of the present invention and the disclosures of these applications are incorporated herein by reference.

In the exemplary embodiment the portable device is carried by a user and communicates with an exemplary ATM 10 through wireless communications. The portable device may communicate for example using Bluetooth™, WAP and/or WML messages. The portable device also includes in memory therein the one or more characteristic features associated with the user of the device. This may include for example information such as the name, account number, biometric data, digital signature and/or other data which may be used to identify the user. It should also be understood that the portable device may also have associated therewith certain security features which limit the use thereof to an authorized user. This may include for example the requirements for password inputs, biometric inputs and/or other inputs so as to enable the portable device to operate in connection with the ATM. As schematically represented in FIG. 5, the exemplary application which operates on the portable device produces a menu output screen 122. The menu output screen presents the user with a menu of transactions and activities that can be carried out using the device. As indicated schematically in FIG. 5, the menu output screen may be alternated with an appropriate screen saver or other graphics which may be presented through the output screen on the portable device when the device is not in use. This is represented by a screen 124.

As represented by a login screen 126 the user is enabled to access the capabilities of the portable device by logging in. This may be done as previously discussed by providing passwords, biometric inputs or other appropriate types of inputs to verify that the device is only operated by an authorized user of the machine. In some embodiments this may include for example having the portable device communicate with devices on the ATM 10 which can read a biometric or other input provided by the operator. Once the device has been enabled, a user is notified of any transaction activities which may have occurred or is provided with any reminders or other information that the user has programmed the device to provide. This may include for example in some embodiments indications of the receipt of e-mail messages, that particular financial transactions that the user has authorized have been carried out or other activities. The particular nature of the activities of which the device is capable and which are indicated once a user has logged on will depend on the particular device and system in which the device is used.

In an exemplary embodiment once a user has logged in, the user is enabled to access banking functions by providing one or more appropriate inputs corresponding to the banking functions. This may be done through an input stylus or other input device used in connection with the portable device. In the exemplary embodiment this causes a banking desktop screen 128 to be produced. From the banking desktop screen the user is enabled to provide inputs that enable access other applications. For example in this embodiment a user may provide an input indicating that they wish to operate an accounting type program which tracks their transaction activities. If such a program is selected, the portable device then operates in accordance with the particular programming and screen logic associated with such a program. This is represented by a screen 130.

Alternatively from the banking desktop screen 128 if a user indicates that they wish to conduct transactions, the device outputs a transaction menu screen 132. In the exemplary embodiment the transaction menu screen 132 enables the user to prepare the transaction instructions prior to the time that the portable device is in communication with the ATM. These transactions may be prepared and stored so that the transaction is staged awaiting execution until the portable device is in communication with the ATM. In this exemplary embodiment from the transaction menu screen the user is enabled to view transactions which have been staged and which are pending execution, as well as transactions which have already been executed during a prior period of time. The details of the particular transactions may vary with the programming of the particular portable device but are generally sufficient so that the user can identify the nature and amount of the transactions.

From the transaction menu screen, the user is enabled to provide inputs indicating that they wish to add a transaction or to delete a transaction which has been already staged, but which has not been executed. If the user elects to add a transaction, the user is presented with an add transaction menu screen 134. The add transaction menu screen presents the user with the option to add value from their account to stored value memory on the portable device or on an article such as a smart card in operative connection therewith. The add transaction menu screen 134 also provides the user with an option to receive a download of information which is pertinent to the user from an ATM or other terminal. This may include for example, information concerning the value of stocks in a portfolio held by a user, money earned as interest, information on electronic deposits to a user's account or other data which is pertinent to the user's financial situation.

If a user selects the add transaction option, the user of an exemplary embodiment of the invention is presented with an add value screen 136. The add value screen 136 presents the user with options for the amount of value to be added from the user's account to the stored value memory or data store on the portable device or on a smart card in operative connection therewith. In response to the user selecting a particular amount from the add value screen, a transaction is staged and the necessary instructions to carry out the transaction are generated and stored in the device. The transaction instructions prepare the device to carry out the requested transaction with the ATM 10 or other appropriate device the next time that the portable device is in communication therewith.

Alternatively, if from the add transaction menu screen, the user elects to receive data concerning one or more of their accounts or the activities associated therewith, the user is presented with a financial update screen 138. The financial update screen requests that the user confirm that they wish to receive an update of their account information the next time the portable device is in communication with the ATM 10 or other appropriate communication device. It should be understood that while in the exemplary embodiment the financial update screen includes only one option for receiving information, in alternative embodiments several different types of account options for information that the user may receive may be presented. In the exemplary embodiment the user's input to the financial update screen causes the device to stage the transaction so that the requested information may be downloaded to the portable device at the next opportunity.

It should be noted that in the exemplary embodiment various screens enable the user to terminate the execution of further steps in the particular logic sequence and return to "home" which is the menu output screen 122. The exemplary embodiment also enables the terminal to move in the logic sequence to an e-commerce desktop screen 140 as later discussed. It should be understood that while in the exemplary embodiment the portable device is operative to create and stage a plurality or "batch" of transactions which are stored and then executed when the portable device is in communication with the ATM 10 or other terminal, embodiments may be operative to receive inputs, provide outputs and carry out transactions while in real time communication with the ATM 10. In this way the portable device may operate as a substitute for one or more of the input and/or output devices on the ATM 10. Of course numerous approaches to conducting transactions and carrying out activities may be used in various embodiments of the invention.

In the exemplary embodiment of the portable device and the software application therein, a user from the menu output screen 122 may select to access the Internet functions provided by the terminal. In response to input indicating such a selection, the application is operative to produce an Internet desktop menu screen 142. The Internet desktop menu screen provides the user of the exemplary embodiment with the option of accessing certain types of predetermined sites accessible through the Internet, which sites provide the user with particular types of information. The Internet menu desktop screen also enables the user to select to operate an e-mail program. Alternatively the Internet menu desktop screen may enable a user to access one or more e-commerce type programs. Of course these options are exemplary and in other embodiments other options may be presented. Of course as previously discussed the Internet menu desktop screen also enables a user to return to the main menu screen 122.

In response to a user providing a selection input from the Internet menu desktop screen 142 indicating that they wish to access an e-mail program, the portable terminal launches an appropriate e-mail program as represented by a screen 144. E-mail programs in embodiments of the invention provide appropriate user interfaces which enable the user to read, send, receive, delete and perform other e-mail functions. Of course the particular capabilities associated with the e-mail program will depend on the particular type of e-mail program used. In the exemplary embodiment a Microsoft® Outlook™ program is included on the portable device, but of course this program is exemplary.

In response to the user providing an input from the Internet menu desktop screen 142 indicative that they wish to access the e-commerce functions, the e-commerce menu screen is presented. The e-commerce logic used in embodiments of the invention may vary depending on the programming provided by the user and/or the programmed capabilities provided by the operator of the ATM 10 or other devices with which the portable device communicates. In the exemplary embodiment as schematically represented in FIG. 5, the user is enabled to select from a number of different sources for goods or services in e-commerce menu screen 140.

In response to the user selecting a particular source of goods or provider of services, further screens are produced by the application. Such screens may include a selection screen 146 which presents the user with a number of possible selections. In response to a user making a selection in the exemplary embodiment, information screens 148 from which a user may elect to receive information about the particular selections, are provided. If the user wishes to purchase a particular item in the exemplary embodiment, a confirmation screen 150 is presented which confirms the purchase by the user.

Again in the exemplary embodiment, the portable device may be operatively programmed with the selections available the user when the portable device is in communication with the ATM or other device which provides such information. The user may later elect to review information concerning these items while the portable device is not operatively connected to the ATM or other terminal, and provide inputs indicative of their desire to purchase particular items. Thereafter when the portable device is enabled to communicate with the ATM 10 or other appropriate terminal, the previously staged purchase transaction is delivered from the portable device to the ATM or other terminal, which then operates to complete the transaction.

It should be understood that this configuration is exemplary and in other embodiments the portable device may additionally or alternatively have the capability of communicating to a network such as the Internet directly via cellular modem or other communications device. This may enable the portable device to send and receive information when the portable device is not in communication with the ATM. In embodiments of the invention a user may choose to conduct the purchase transactions on a wireless basis without routing the transaction through the ATM or other terminal. Alternatively the portable device may operate to obtain the information concerning items available for purchase directly on a wireless basis from the Internet. However any purchase transactions may be staged so that the purchase transactions are carried out only when the portable device is in communication with the ATM 10, or other more secure communications device. Of course various approaches may be used with embodiments of the invention and the particular approach taken will depend on the programming of the portable device, the operator of the system and the desires of the user.

In some exemplary embodiments of the invention, information concerning the user may be used in connection with a customer relationship management (CRM) system to provide appropriate product selections for the particular user. This may include for example items or information which are likely to be of interest to the user based on past information provided, prior purchases, demographic information or other data concerning the particular user. Such information may be gathered through the ATM 10 in various embodiments and used for delivering the particular e-commerce information which is delivered to the portable device for presentation through the e-commerce desktop screens. Of course such approaches are exemplary and in other embodiments other approaches may be used.

In the exemplary embodiment from the Internet menu desktop screen 142 a user is enabled to elect to receive certain types of information that may be available through the Internet or other sources. In the exemplary embodiment, a selection of this particular function results in the presentation of the Internet menu screen 152. The Internet menu screen presents outputs indicative of the types of information that are available to the user for review. These types of information include in the exemplary embodiment information concerning weather, maps or news reporting. It should be understood that these categories of information are exemplary. In other embodiments other or additional types of information may be provided.

In the exemplary embodiment the information in the various categories presented through menu screen 152 are delivered to the portable device through the ATM terminal. These categories of information are enabled to be effectively tailored to the present whereabouts of the user due to the known location of the ATM terminal 10 and its particular assigned network address. As a result in the exemplary embodiment the selection of the weather function from screen 152 causes the presentation of a weather information screen 154. Weather information screen 154 provides the user with information concerning the weather that is expected in the location of the particular ATM terminal 10. Likewise selection of the maps function from the menu screen 52 causes the presentation of a map information screen 156. The exemplary map information screen provides the user with options to review a map as well as points of interest which are in the area of ATM 10. In this way the user is enabled to review information about the area in which they and their portable device are located. Likewise the selection of the news function from screen 152 may enable a user to learn both national and local news which is pertinent to the area where the user is located.

In the exemplary embodiment the Internet information is updated each time the portable device is in communication with ATM 10 or another terminal. Such communication may occur without intervention from the user such that the user's portable device would include the information pertinent to the most recent connection made by the device so that the information would generally reflect the area where the user is located. In alternative embodiments the portable device could be updated with other selected types or categories of information. Of course these approaches are exemplary and in other embodiments, other approaches may be used.

In the exemplary embodiment of the invention the menu output screen 122 also enables a user to select a customer service function through an appropriate input. The customer service function provides the user with appropriate output screens schematically indicated 157. Output screen 157 includes an option for a user to receive one or more outputs which have been loaded into the portable terminal. These outputs may include for example, instructions to a user for operating the portable terminal or related systems, instructions for accessing particular services or information, or a program through which the customer may ask specific questions to particular service providers such as the operator of ATM 10 or other entities which provide goods or services to the user. The output screen 157 may also enable a user to receive video presentations, advertising or other information that may be of interest. Of course these functions and options are exemplary and in other embodiments other features, functions and operations may be provided.

As can be appreciated, the exemplary forms of the invention enables the ATM to be operated in a manner that is best suited to the particular individual who is identified as adjacent to the ATM. This results in the ATM being usable by more types of individuals and through different types of inputs and under varying conditions.

Alternative embodiments of the invention may be employed in connection with a drive-through transaction environment. In such circumstances, the interface parameters associated with a particular individual may correspond with the user's vehicle. In this way upon sensing a particular user adjacent to the machine, the interface adjusts in accordance with the interface parameters that correspond to the user's capability as well as to the nature of the user's vehicle. Alternatively, the system may be programmed to identify a particular vehicle or vehicle type by license plate, VIN number, RF signal, optical signal, RF back scatter data, onboard vehicle computer or other characteristic data and to adjust the orientation and operation of the user interface to the vehicle as well as the user. Embodiments of the invention may be used in combination with a system like that described in co-pending U.S. patent application Ser. No. 09/414,290 filed Oct. 7, 1999 and owned by the assignee of the present invention and incorporated herein by reference. The system of that invention describes apparatus for capturing and analyzing images including analyzing and identifying particular objects included within a field of view. In alternative embodiments of the present invention, the principles of the incorporated disclosure may be used to identify the particular type of vehicle and/or parameters associated with the vehicle such as the height of the driver's window or the position of the driver's head so that the height and tilt of the display screen, other machine devices and other parameters may be adjusted in accordance with the vehicle as well as the interface parameters associated with the particular authorized user. Such an approach reduces the inconvenience associated with conducting drive-through transactions in which the user interface of the transaction terminal is not suitably positioned or configured for easy operation by a person in a particular type of vehicle.

In exemplary forms of the system present invention, information concerning a plurality of users authorized to operate the system is stored in one or more data stores. The particular characteristic features of the users which are sensed and which are used to identify them as a particular user and/or as part of a particular group of users, are also stored in associated relation with the identity of the user. Information concerning the user's physical stature, the user's particular impairment, if any, preferences for conducting transactions, portable or other appliances used, product preference information, account data, information preference data and/or other information which is pertinent to the manner in which the user prefers to conduct transactions by interfacing with the ATM, may be stored as one or more interface parameters. The interface parameters may be stored in associated relation with the information corresponding to the particular authorized user. It should be understood that the interface parameter data in some embodiments may include multiple ways for the user to interface with the machine, or hierarchy data which causes the computer to change the manner of operation of the machine, and which enables a user to interface with the machine in an alternative manner if the most preferred method is not available at the particular machine.

As can be appreciated from the foregoing description, in an exemplary transaction conducted, at ATM 10 a user approaches the ATM. In a case where the user is being identified by appearance the camera 18 operates to sense one or more of the user's facial features which serve as characteristic features which identify the user. The computer 62 operates to cause the characteristic features associated with the user to be compared to stored data. This comparison may be made to stored data in the data store 114 located in the ATM. Alternatively, the computer 62 may be operative to communicate through the network 116 to a remote computer which includes data corresponding to users in its associated data store. A computer holding the user data is operative to determine if the sensed characteristic features correspond to one of the authorized users. If the characteristic feature data does correspond to an authorized user, the computer is operative to determine the interface parameters associated with that user.

In the exemplary embodiment, if the user at the ATM 10 does not present characteristic features of an authorized user and/or the system is unable to determine with a sufficient degree of probability that the user is an authorized user, the system may be programmed to have the user provide additional inputs. This may include for example, requesting that the user provide a voice input. Alternatively, the user may be requested to provide an input from a card or other article that may be read by the card reader 42. If the user is identified responsive to the supplemental inputs, the interface parameters associated with the identified user are then resolved through operation of one or more computers.

Figure 4:
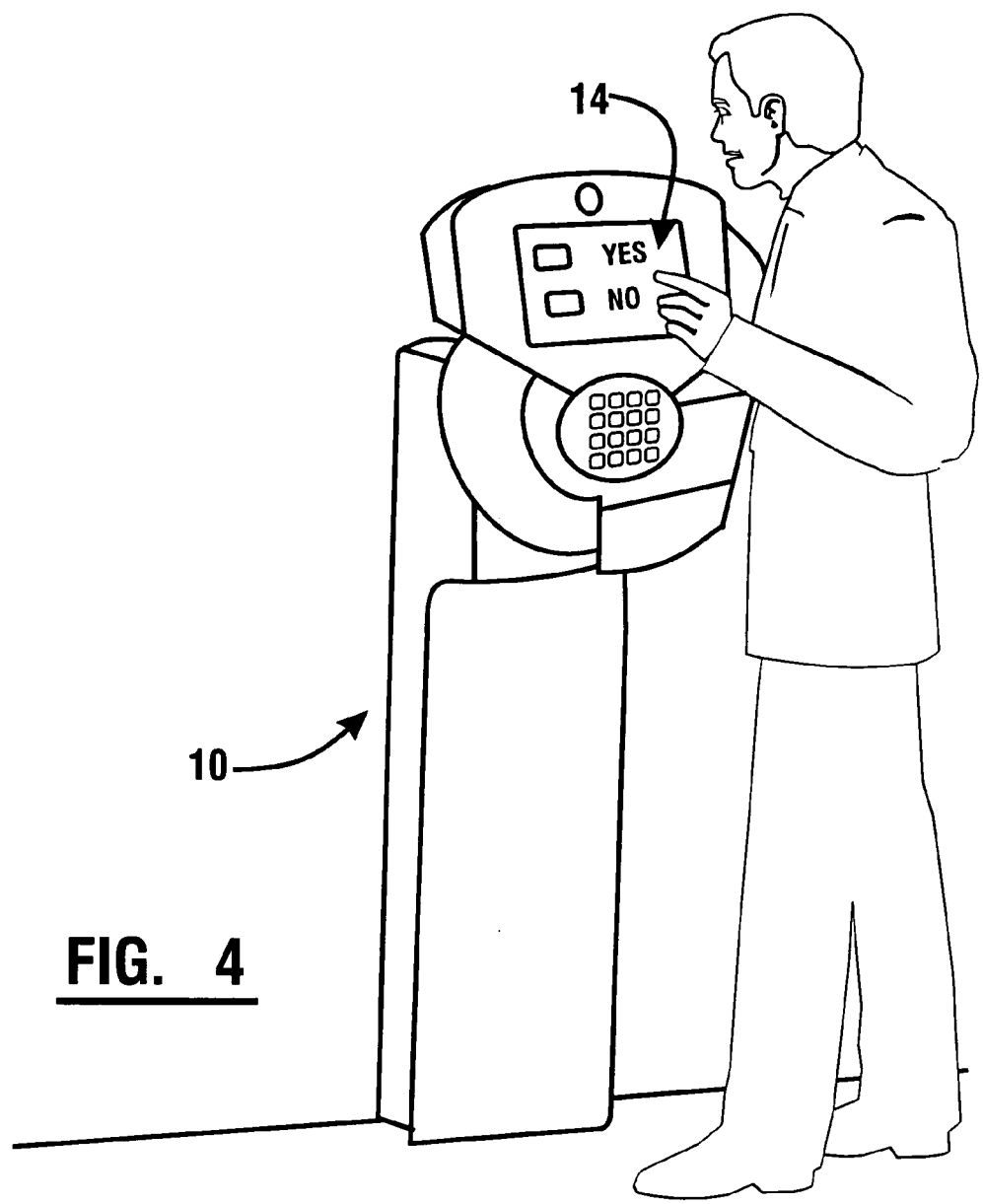
FIG. 4 is a view of the apparatus similar to FIG. 1 with the display screen moved to a position to accommodate a particular user adjacent to the apparatus.

Once the particular user adjacent to the ATM has been identified or classified as a member of a particular subset or group of users, the corresponding interface parameters are recovered or resolved responsive to stored data and used to operate the computer 62 and move the display screen to the desired height and angle of tilt for that particular user. This is represented in FIG. 4 in which the display screen is in a different position from that shown in FIG. 1. As shown in FIG. 4, the display screen moves to a suitable position for ease of operation by the particular user. In the case of the sighted user who will operate the ATM through inputs to the touch screen, the vertical height and angle of tilt of the screen is brought to a position based on one or more of the interface parameters which should be optimum for the particular user's height.

For users whose interface parameter data indicates that they will not use the display screen for operating the ATM, the display screen or other components of the screen may move to a retracted position or may move so as to render additional devices accessible to a user. As previously discussed, in the case of a user who is visually impaired, the computer 62 may operate responsive to one or more of the interface parameters to present outputs through the display screen in which the size, color, sequence or language of text, numerical, or other symbols or indicia on the screen, are adjusted to conform with the parameters associated with the identified user.

Alternatively or in addition, the computer may operate responsive to the one or more interface parameters to enable operation of the ATM in response to audio signals. Alternatively, if the user's desired transaction is through use of a headset or a connector, the computer operates to open access doors or otherwise make such devices accessible to the user and to control the operation of such devices in the manner dictated by the interface parameters so that the user may conduct their transaction. Alternatively, depending on the interface parameters associated with the particular user, the keypad or other tactile input devices may be rendered operative to enable inputs thereto and control the transaction function devices. This may be done while the outputs from the display screen are shut off or changed so as not to reflect transaction information.

In cases where the user carries a portable device the one or more characteristic features may be provided through the signals from the portable device. As previously discussed, in exemplary embodiments these signals may in some cases be initiated automatically upon the portable device coming into communication with the ATM 10. This may occur for example in some embodiments without any real time inputs from the user as the device operates to carry out batch transactions which have been previously staged, provide updates to information which has been requested and communicate other information that was transmitted to and from the portable device. During such transactions the user interface of the machine may adjust as appropriate to the user so as to indicate that their transactions are being updated. Alternatively the user interface may give no indication at all of the occurrence of transactions. In some embodiments transactions being carried out automatically without user intervention with a portable device may be ongoing concurrently with other transactions which the ATM is carrying out for another person. Alternatively the portable device may provide user identifying data such as biometric information which is verified through operation of reading devices or other devices on the ATM, and which may enable the ATM to be operated without the need for the user to provide a card or other type of input. Embodiments of the invention also enable the user to add value to a stored value device such as a smart card or data which is representative of value within a memory of the portable device without having to physically engage the card or device with the ATM. As will be appreciated, numerous approaches to carrying out transactions and communicating with users through a financial transaction apparatus are encompassed by the principles of the present invention.

The particular user is thus enabled to provide inputs and to receive outputs so that the user may conduct such transactions as they are authorized to conduct and which are available through the transaction machine. The exemplary embodiments of the present invention enable a single automated financial transaction apparatus to operate in numerous ways, tailored to the particular requirements of a user. This results in greater user satisfaction and higher utilization of the system.

Thus, the automated financial transaction apparatus and method of the present invention achieves at least one of the above-stated objectives, eliminates difficulties encountered in the use of prior devices and systems, solves problems and attains the desirable results described herein.

In the foregoing description, certain terms have been used for brevity clarity and understanding. However, no unnecessary limitations are to be implied therefrom because such terms are used for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method comprising:
   a) storing in at least one data store in operative connection with at least one computer, data corresponding to a plurality of users, wherein the data associates each respective one of the plurality of users with at least one characteristic feature and at least one interface parameter;
   b) sensing with a reading device in operative connection with an automated financial transaction apparatus, at least one characteristic feature of a user adjacent to the automated financial transaction apparatus;
   c) determining from the at least one data store through operation of the at least one computer responsive to the at least one characteristic feature sensed in step (b), the at least one interface parameter associated with the user in the at least one data store;
   d) moving through operation of the at least one computer, a display screen of the automated financial transaction apparatus with a moving device responsive to the at least one interface parameter determined in step (c).

2. The method according to claim 1 wherein in step (d) the display screen is moved to change a height of the display screen.

3. The method according to claim 1 wherein in step (d) the display screen is moved to change a tilt angle of the display screen.

4. The method according to claim 1 wherein in step (d) the display screen is moved to change both a height and a tilt angle of the display screen.

5. The method according to claim 1 and further comprising:
   e) providing responsive to operation of the at least one computer, at least one output through the display screen responsive to the at least one interface parameter determined in step (c).

6. The method according to claim 5 wherein in step (e) the at least one output includes text material, and wherein size of the text material included in the at least one output is determined responsive to the at least one interface parameter.

7. The method according to claim 5 wherein in step (e) the at least one output includes an icon, and wherein size of the icon included in the at least one output is determined responsive to the at least one interface parameter determined in step (c).

8. The method according to claim 5 wherein in step (e) the at least one output includes text material, and wherein language of the text material is determined responsive to the at least one interface parameter determined in step (c).

9. The method according to claim 5 wherein in step (e) the at least one output includes at least one numeral, and wherein size of the at least one numeral is determined responsive to the at least one interface parameter determined in step (c).

10. The method according to claim 5 wherein in step (e) the at least one output includes at least two colors, and wherein at least one of the colors is determined responsive to the at least one interface parameter determined in step (c).

11. The method according to claim 5 wherein in step (e) a sequence comprising a plurality of outputs is presented, and wherein the sequence is determined responsive to the at least one interface parameter determined in step (c).

12. The method according to claim 1 and further comprising:
   e) controlling at least one audio output device in operative connection with the apparatus, responsive to the at least one interface parameter determined in step (c).

13. The method according to claim 12 wherein in step (e) the volume of the at least one audio output device is controlled responsive to the at least one interface parameter determined in step (c).

14. The method according to claim 12 and prior to step (e) further comprising the step of:
   f) connecting a portable audio output device associated with the user to a connector in operative connection with the apparatus.

15. The method according to claim 12 wherein step (e) includes making a handset accessible to the user.

16. The method according to claim 12 wherein step (e) includes generating white noise through the at least one audio output device.

17. The method according to claim 1 and further comprising:
   e) controlling at least one audio input device in operative connection with the apparatus, responsive to the at least one interface parameter determined in step (c).

18. The method according to claim 1 and further comprising:
   e) activating input capability of at least one tactile input device in operative connection with the apparatus, responsive to the at least one interface parameter determined in step (c).

19. The method according to claim 18 wherein the at least one transaction function device is operative to dispense cash, wherein in step (e) the at least one tactile input device includes a keypad, wherein inputs to the keypad are operative to control at least one transaction function device in operative connection with the at least one computer.

20. The method according to claim 1 and further comprising:
  e) rendering the display screen inoperative to show transaction information responsive to the at least one interface parameter determined in step (c).

21. The method according to claim 1 wherein in step (a) the at least one characteristic feature for each user corresponds to an appearance feature.

22. The method according to claim 21 wherein in step (a) the appearance feature includes at least one feature of facial appearance.

23. The method according to claim 21 wherein in step (a) the appearance feature includes eye appearance.

24. The method according to claim 21 wherein in step (a) the appearance feature includes at least a portion of at least one fingerprint.

25. The method according to claim 1 wherein in step (a) at least one characteristic feature for each user corresponds to both an appearance feature and a voice feature.

26. The method according to claim 1 wherein in step (a) the at least one characteristic feature for each user corresponds to data included on an article carryable by the user.

27. The method according to claim 26 wherein in step (a) the data corresponds to an account number associated with the user.

28. The method according to claim 1 wherein in step (a) at least one characteristic feature of each user corresponds to a voice feature of the user.

29. The method according to claim 1 wherein the automated financial transaction apparatus comprises an automated banking machine including a cash dispenser device, and further comprising
  (e) reading first data from a data bearing record provided by the user;
  (f) operating the at least one computer to cause the first data read in step (e) to be compared with authorized user data stored in the at least one data store;
  (g) reading second data provided by the user;
  (h) operating the at least one computer to cause the second data read in step (g) to be compared with authorized user data stored in the at least one data store; and
  (i) responsive to a positive comparisons in both step (f) and step (h), determining that the machine user is an authorized user of the machine, wherein an authorized user is permitted use the machine to reallocate money among various financial accounts.

30. An apparatus comprising:
  at least one data store,
    wherein the at least one data has stored therein, data corresponding to a plurality of users, wherein the data associates each respective one of the plurality of users with at least one characteristic feature and at least one interface parameter,
  a reading device in operative connection with an automated financial transaction apparatus including a display screen,
    wherein the reading device is operative to sense at least one characteristic feature of a user adjacent to the automated financial transaction apparatus,
  at least one computer,
    wherein the at least one computer is in operative connection with the at least one data store,
      wherein the at least one computer, responsive to the at least one characteristic feature of a user sensed by the reading device, is operative to determine from the at least one data store, the at least one interface parameter associated with the user in the at least one data store, and
      wherein the at least one computer is operative to cause the display screen to be moved with a moving device responsive to the at least one interface parameter determined from the at least one data store.

31. The apparatus according to claim 30 wherein the moving device enables changing the height and tilt angle of the display screen, and wherein the height and tilt angle are changed through operation of the at least one computer in accordance with the at least one interface parameter associated with the user.

32. The apparatus according to claim 30 and further comprising a tactile input device and a transaction function device including at least one of a cash dispenser and a cash acceptor, and wherein the at least one computer is operative in accordance with the at least one interface parameter associated with the user to enable the transaction function device to operate responsive to at least one input to the tactile input device.

33. The apparatus according to claim 30 and further comprising an audio input device and a transaction function device, wherein the transaction function device includes at least one of a cash dispenser and a cash acceptor, and wherein the at least one computer is operative in accordance with the at least one interface parameter associated with the user to cause the transaction function device to operate responsive to at least one input to the audio input device.

34. The apparatus according to claim 30 wherein the reading device includes an imaging device, wherein the characteristic feature sensed by the reading device includes an appearance feature of a user of the automated financial transaction apparatus.

35. The apparatus according to claim 30 wherein the automated financial transaction apparatus comprises an automated banking machine including a cash dispenser device,
  wherein the reading device is operative to read first data from a data bearing record provided by the user,
  wherein the at least one computer is operative to cause read first data to be compared with authorized user data stored in the at least one data store,
  wherein the reading device is operative to read second data provided by the user,
  wherein the at least one computer is operative to cause read second data to be compared with authorized user data stored in the at least one data store,
  wherein responsive to both a positive comparison of the read first data with authorized user data and a positive comparison of the read second data with authorized user data, the at least one computer is operative to determine that the machine user is an authorized user of the machine, wherein an authorized user is permitted use the machine to reallocate money among various financial accounts.

36. An automated financial transaction apparatus comprising:
  a reading device operative to sense at least one characteristic feature associated with each of a plurality of users;

a movably mounted display screen;

a movement mechanism in operative connection with the display screen;

a computer in operative connection with a data store, the computer also in operative connection with the reading device and the movement mechanism, wherein the data store includes data corresponding to a plurality of characteristic features, wherein at least one of the characteristic features corresponds to at least one of the plurality of users, and for each one of the characteristic features at least one associated interface parameter, wherein the interface parameter corresponds to a position of the display screen;

wherein the computer is operative responsive to the reading device sensing a first characteristic feature corresponding to one of the plurality of users, to cause the movement mechanism to move the display screen to a position corresponding to an interface parameter associated in the data store with the first characteristic feature.

37. An automated financial transaction apparatus comprising:

a data receiving device operative to receive data indicative of at least one characteristic feature corresponding to a user;

a display screen device;

at least one actuator selectively operable to physically move the display screen device;

at least one computer in operative connection with the at least one actuator and at least one data store, wherein the data store includes data representative of a plurality of characteristic features, and for each characteristic feature, a corresponding user and at least one interface parameter, wherein the at least one computer is operative responsive to the data receiving device receiving data indicative of at least one first user characteristic feature, to determine first user data corresponding to a first user, determine at least one first user interface parameter corresponding to the first user data, and cause the at least one actuator to either operate or not operate to physically move the display screen device based on the at least one first user interface parameter.

38. The apparatus according to claim 37 wherein the at least one actuator is operative to change an angle of view of the display screen device.

39. The apparatus according to claim 37 wherein the at least one first user characteristic feature comprises a biometric input.

40. The apparatus according to claim 37 wherein the at least one first user characteristic feature comprises a wireless signal from a portable device.

41. The apparatus according to claim 37 wherein the at least one actuator is operative to change vertical height of the display screen device.

42. An automated financial transaction apparatus comprising:

a display screen device, at least one computer, wherein the at least one computer is operative to permit an authorized user to carry out a transaction, wherein the at least one computer is operative to cause to be determined for each respective one of a plurality of authorized users, at least one respective interface parameter correlated in at least one data store with the respective authorized user, wherein for each respective authorized user, the correlated at least one respective interface parameter includes a respective display screen device position, and wherein for each respective authorized user the at least one computer is operative to cause the display screen device to be physically moved to the respective display screen device position correlated with that respective authorized user in the at least one data store.

43. The apparatus according to claim 42 and further comprising at least one actuator operable to physically move the display screen device, and wherein the at least one computer is operative to cause the at least one actuator to physically move the display screen device.

* * * * *

UNITED STATES PATENT AND TRADEMARK OFFICE
CERTIFICATE OF CORRECTION

PATENT NO.       : 7,644,039 B1
APPLICATION NO. : 09/778604
DATED            : January 5, 2010
INVENTOR(S)      : Magee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1931 days.

Signed and Sealed this

Sixteenth Day of November, 2010

David J. Kappos
*Director of the United States Patent and Trademark Office*